United States Patent
Toliver

(10) Patent No.: US 6,578,882 B2
(45) Date of Patent: Jun. 17, 2003

(54) CORRUGATED PIPE STRUCTURE

(75) Inventor: Timothy R. Toliver, Findlay, OH (US)

(73) Assignee: Hancor, Inc., Findlay, OH (US)

( * ) Notice: Subject to any disclaimer, the term of this patent is extended or adjusted under 35 U.S.C. 154(b) by 0 days.

(21) Appl. No.: 09/912,183

(22) Filed: Jul. 24, 2001

(65) Prior Publication Data

US 2002/0060454 A1 May 23, 2002

Related U.S. Application Data

(60) Provisional application No. 60/247,103, filed on Nov. 10, 2000.

(51) Int. Cl.$^7$ ............................................. F16L 17/00
(52) U.S. Cl. ..................... 285/374; 285/230; 285/903; 285/49; 285/347
(58) Field of Search ..................... 285/45, 374, 230, 285/231, 903, 347

(56) References Cited

U.S. PATENT DOCUMENTS

| | | |
|---|---|---|
| 3,520,047 A | 7/1970 | Muhlner et al. |
| 3,550,639 A | 12/1970 | Okuda |
| 3,632,732 A | 1/1972 | Osterhagen et al. |
| 3,749,543 A | 7/1973 | Stansbury |
| 3,806,301 A | 4/1974 | Osterhagen et al. |
| 3,823,216 A | 7/1974 | Petzetakis |
| 3,998,578 A | 12/1976 | Acda |
| 4,005,968 A | 2/1977 | Crawford |
| 4,030,872 A | 6/1977 | Parmann |
| RE29,446 E | 10/1977 | Sonnleitner et al. |
| 4,107,249 A | 8/1978 | Murai et al. |
| 4,134,949 A | 1/1979 | McGregor |
| 4,150,087 A | 4/1979 | de Putter et al. |
| 4,157,372 A | 6/1979 | Kyomen |
| 4,161,384 A | 7/1979 | McGregor |
| 4,170,448 A | 10/1979 | French |
| 4,177,237 A | 12/1979 | Ueno et al. |
| 4,204,823 A | 5/1980 | Hayes et al. |
| 4,218,208 A | 8/1980 | Hayes et al. |
| 4,239,473 A | 12/1980 | Fulhaber |
| 4,266,926 A | 5/1981 | Gordon |
| 4,277,231 A | 7/1981 | Gordon |
| 4,279,853 A | 7/1981 | Ohta et al. |
| 4,299,412 A | 11/1981 | Parmann |
| 4,315,630 A | 2/1982 | French et al. |
| 4,331,625 A | 5/1982 | van de Zee et al. |
| 4,338,716 A | 7/1982 | Marissen et al. |
| 4,353,860 A | 10/1982 | Gordon |
| 4,379,115 A | 4/1983 | Seach et al. |
| 4,395,379 A | 7/1983 | Herder et al. |
| 4,474,726 A | 10/1984 | Ohta et al. |
| 4,545,951 A | 10/1985 | Gordon |
| 4,723,905 A | 2/1988 | Vassallo et al. |
| 4,779,651 A | 10/1988 | Hegler et al. |
| 4,826,028 A | 5/1989 | Vassallo et al. |
| 4,834,430 A | 5/1989 | Vassallo et al. |
| 4,906,010 A | 3/1990 | Pickering et al. |
| 5,064,207 A | 11/1991 | Bengtsson |
| 5,296,188 A | 3/1994 | Lupke |
| 5,678,610 A | 10/1997 | Scarazzo et al. |
| 5,996,635 A | 12/1999 | Hegler |
| 6,126,209 A | 10/2000 | Goddard |
| 6,199,592 B1 | 3/2001 | Siferd et al. |
| 6,227,578 B1 * | 5/2001 | Fukui et al. ............... 285/179 |
| 6,340,181 B1 * | 1/2002 | Amatsutsu ................ 285/321 |
| 6,343,623 B2 | 2/2002 | Hegler |

FOREIGN PATENT DOCUMENTS

JP 2-66393 * 6/1990

\* cited by examiner

*Primary Examiner*—Lynne H. Browne
*Assistant Examiner*—Aaron M Dunwoody
(74) *Attorney, Agent, or Firm*—Jones Day

(57) ABSTRACT

A pipe structure includes an annular corrugation centered on an axis. The corrugation has a cylindrical liner centered on the axis, two annular sidewalls extending radially outward from axially opposite ends of the liner, and an annular crown extending axially between radially outer ends of the sidewalls. An annular cavity is centered on the axis and is bounded by the liner, the sidewalls and the crown. A structural filler is contained within the cavity.

20 Claims, 5 Drawing Sheets

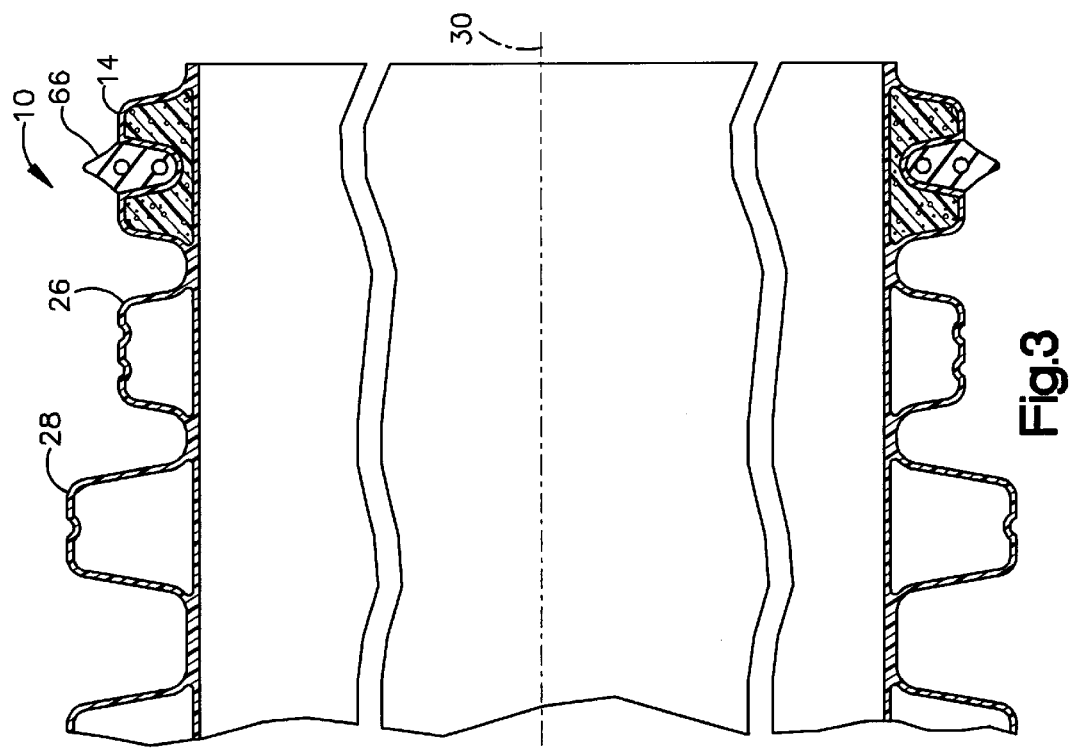
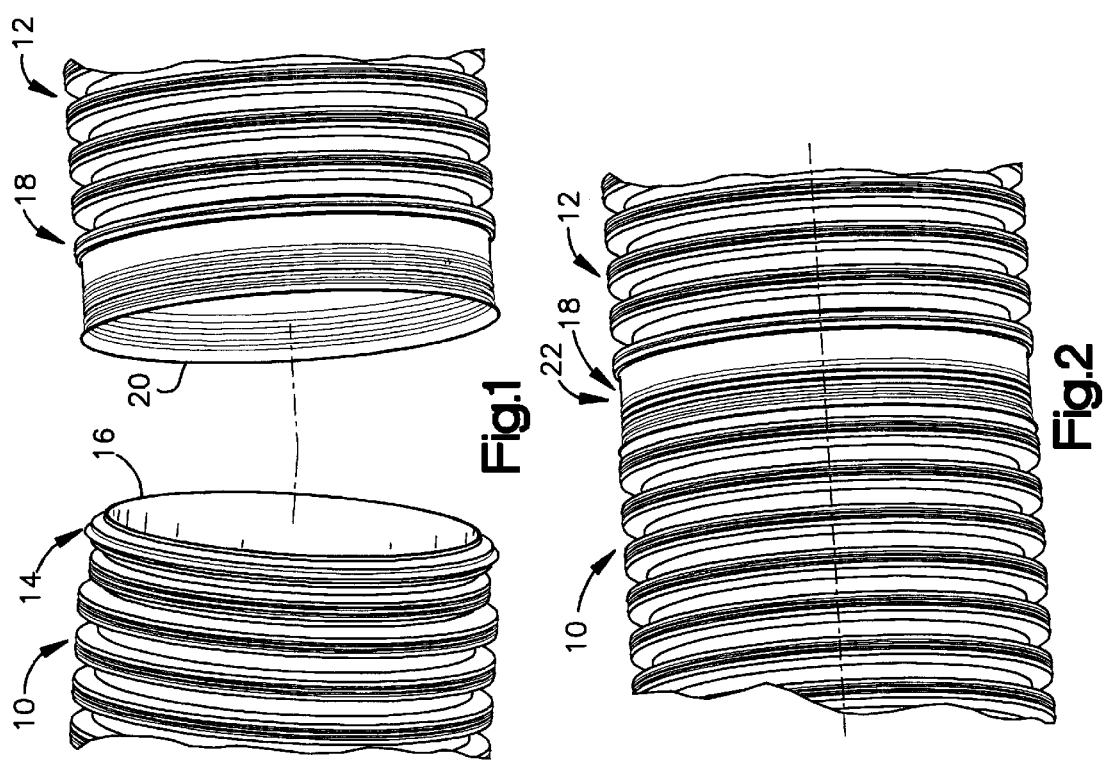

US 6,578,882 B2

CORRUGATED PIPE STRUCTURE

This application claims the benefit of U.S. Provisional Application No. 60/247,103, filed Nov. 11, 2000.

FIELD OF THE INVENTION

The present invention relates to corrugated pipes. More specifically, the invention relates to corrugated pipe structures that are joined together.

BACKGROUND OF THE INVENTION

Corrugated pipes are joined together end to end to form sealed joints. This is facilitated by telescopic insertion of an open outer end of one pipe into an open outer end of another pipe.

SUMMARY OF THE INVENTION

In accordance with a first feature of the present invention, a pipe structure has an annular corrugation centered on an axis. The corrugation has a cylindrical liner centered on the axis, two annular sidewalls extending radially outward from axially opposite ends of the liner, and an annular crown extending axially between radially outer ends of the sidewalls. The pipe structure further has an annular cavity centered on the axis and bounded by the liner, the sidewalls and the crown. A structural filler is contained within the cavity.

In a preferred embodiment of the invention, the crown defines an annular groove extending radially inward and centered on the axis. An annular gasket is received within the groove, and is configured to provide a seal between the pipe structure and a section of another pipe structure that telescopically receives the pipe structure. The filler has a solid state attained by curing of the filler while confined within the cavity. In the preferred embodiment, the filler is preferably a foam with an expanded state that has an actual density that is greater than the freely expanded density of the foam.

In accordance with a second feature of the present invention, a pipe structure includes a bell centered on an axis. The bell has an open outer end and a barrel configured to telescopically receive a section of another pipe structure inserted inward through the open outer end. An annular backwall of the bell extends radially inward from the barrel. The pipe structure further includes a first corrugation axially adjacent to the bell. A reinforcing structure extends axially from the bell to the first corrugation, and constrains axial movement of the bell relative to the first corrugation.

In a preferred embodiment, the reinforcing structure is a ring that extends around the axis. An annular band is wrapped about the barrel and is configured to resist circumferential expansion of the barrel.

The present invention further comprises a method of reinforcing a bell of a pipe. A barrel of the bell has a radially inner surface that is configured to telescopically receive a section of another pipe. The method includes inserting a proving ring within the barrel. A strap is wrapped about the barrel with a tension that forces the radially inner surface of the barrel to adopt an inner circumference that equals the outer circumference of the proving ring. Subsequently, the strap is installed about the barrel to resist circumferential expansion of the radially inner surface of the barrel. The proving ring is then removed.

Another method of reinforcing a bell of a pipe includes wrapping a strap about the barrel. Two portions of the strap are fastened together to form the strap into a reinforcing band having a predetermined inner circumference. The inner circumference is chosen such that the band forces a radially inner surface of the barrel to adopt and maintain a desired inner circumference.

BRIEF DESCRIPTION OF THE DRAWINGS

FIG. 1 is a perspective view of first and second pipes, together including an embodiment of the present invention, shown separately;

FIG. 2 is a perspective view of the pipes of FIG. 1, shown coupled together;

FIG. 3 is a sectional view of the first pipe of FIG. 1;

DESCRIPTION OF THE INVENTION

Figure 4:
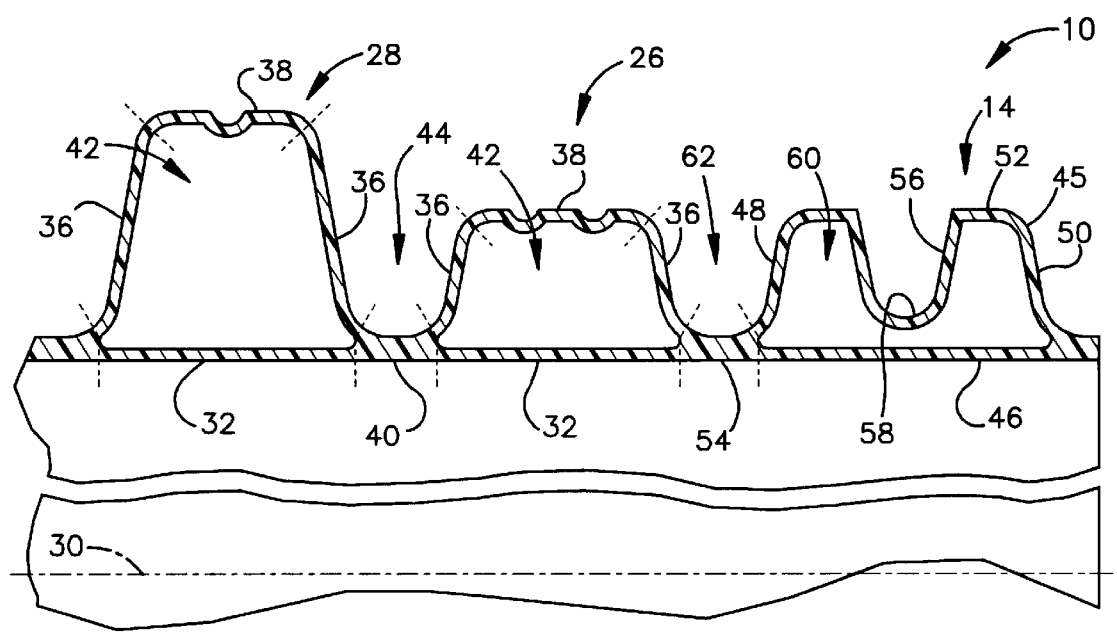
FIG. 4 is an enlarged partial view of corrugations shown in FIG. 3.

FIG. 1 shows first and second pipes 10 and 12 constructed in accordance with the present invention. These particular pipes 10 and 12 are for use in a storm sewer. The first pipe 10 has a spigot 14 defining an open outer end 16 of the first pipe 10. The second pipe 12 has a bell structure 18 defining an open outer end 20 of the second pipe 12. The spigot 14 and the bell structure 18 are configured such that the pipes 10 and 12 can be joined together by insertion of the spigot 14 into the bell structure 18. As shown in FIG. 2, the bell structure 18 telescopically receives the spigot 14 (FIG. 1) in sliding relationship to form a sealed joint 22.

As shown in FIG. 3, the first pipe 10 is a corrugated pipe centered on an axis 30. The first pipe 10 has a plurality of corrugations in an array extending axially along the length of the first pipe 10. These include first and second corrugations 26 and 28 located axially inward from the spigot 14. The profiles of the other corrugations (not shown) along the length of the pipe 10 are similar to the profile of the second corrugation 28. The profile of the first corrugation 26 is shorter than that of the second corrugation 28 to enable the first corrugation 26 to fit into the bell structure 18.

In the enlarged view of FIG. 4, the boundaries between sections of the corrugations 26 and 28 are indicated by dashed lines. Each corrugation 26 and 28 includes a cylindrical liner 32 centered on the axis 30. A pair of annular sidewalls 36 extend radially outward from axially opposite ends of each liner 32. As mentioned above, the sidewalls 36 of the first corrugation 26 are shorter than the sidewalls 36 of the second corrugation 28. An annular crown 38 extends axially between the radially outer ends of each pair of sidewalls 36. The crowns 38 in this embodiment have undulating contours. As known in the art, the crowns 38 may alternatively have flat contours. Each corrugation 26 and 28, comprising the liner 32, the pair of sidewalls 36 and the crown 38, is preferably composed of polyethylene, which is a thermoplastic.

A root 40 extends between adjacent liners 32 of the first and second corrugations 26 and 28. The liner 32, the pair of sidewalls 36 and the crown 38 in each corrugation 26 and 28 define an annular cavity 42 which is centered on the axis 30. Extending between the first and second corrugations 26 and 28 is a trough 44. The trough 44 is bounded by the root 40 and the adjacent sidewalls 36.

As shown in FIG. 4, the spigot 14 comprises a spigot corrugation 45 that is structurally similar to the first corrugation 26. The spigot corrugation 45 includes a cylindrical liner 46 centered on the axis 30. The spigot corrugation 45 further includes two annular sidewalls 48 and 50 that extend radially outward from the axially opposite ends of the liner 46. The sidewalls 48 and 50 of the spigot 14 have a radially-extending length that enables the spigot 14 to closely fit into the bell structure 18 (FIG. 1) when the first and second pipes 10 and 12 are joined together. An annular crown 52 extends between the radially outer ends of the sidewalls 48 and 50. The crown 52 has an annular groove 56 extending radially inward and centered on the axis 30. At the bottom of the groove 56 is a gasket seat 58 that is rounded and routed. The spigot corrugation 45 also is preferably composed of polyethylene.

A root 54 extends between the liner 46 of the spigot 14 and the liner 32 of the first corrugation 26. The liner 46, the sidewalls 48 and 50 and the crown 52 define an annular cavity 60 centered on the axis 30. A trough 62 is located between the spigot 14 and the first corrugation 26. The trough 62 is bounded by the root 54 and the sidewalls 36 and 48 adjacent to the root 54.

Figure 5:
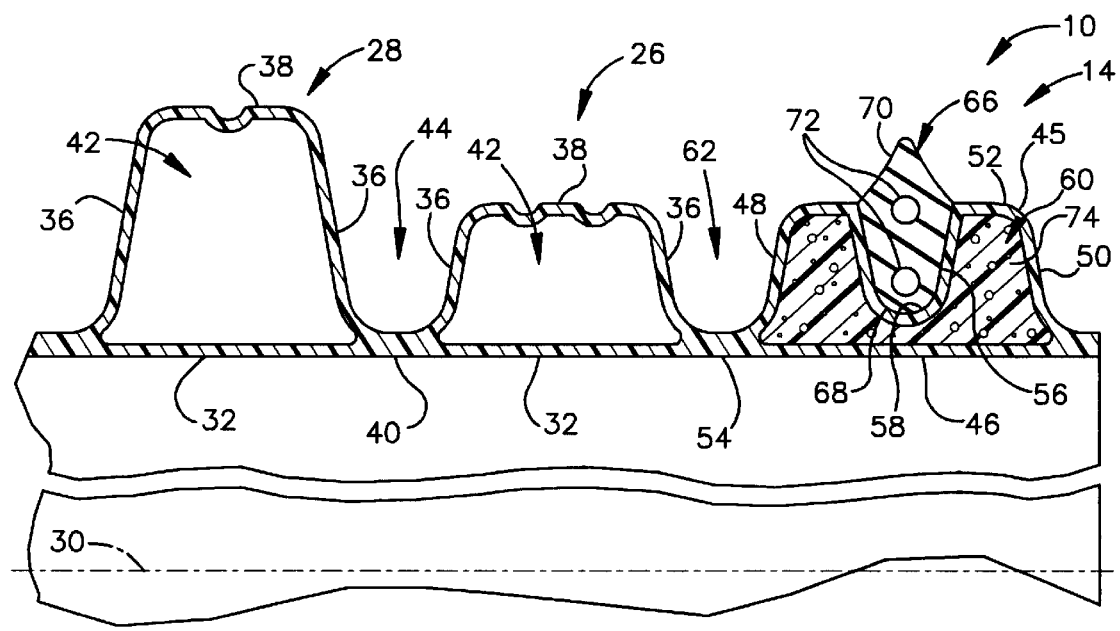
FIG. 5 is an enlarged partial view of parts shown in FIG. 3.

As shown in FIG. 5, the spigot 14 further has an annular rubber gasket 66 centered on the axis 30. A radially inner surface 68 of the gasket 66 is seated on the gasket seat 58 within the groove 56. A radially outer surface 70 of the gasket 66 is located outside the groove 56. Extending circumferentially through the gasket 64 are two annular voids 72. The voids 72 enhance the flexibility of the gasket 60.

Figure 6:
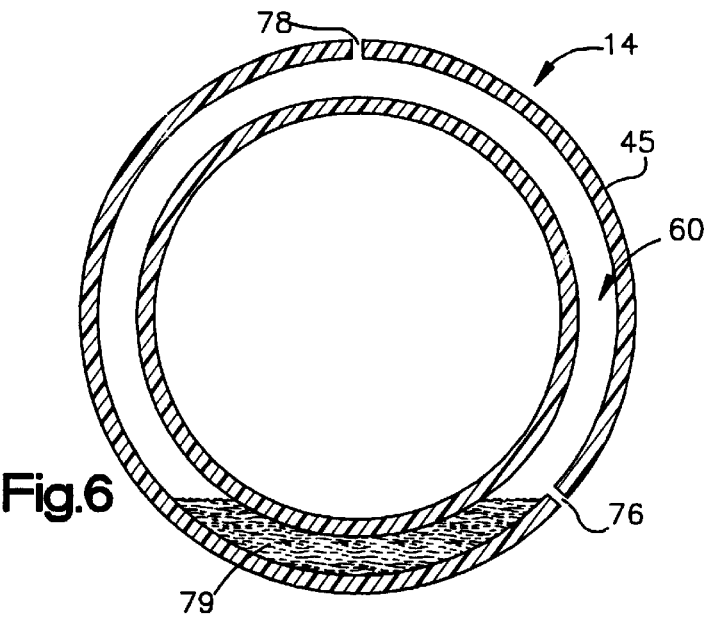
FIG. 6 is a sectional view of the first pipe of FIG. 1, shown in a partially assembled condition.

The cavity 60 of the spigot 14 is filled with a foam filler 74 that structurally reinforces the spigot 14. In this embodiment, the foam is polyurethane. The process for filling the cavity 60 with the filler 74 is partially illustrated in FIG. 6. This process occurs before the gasket 66 (FIG. 5) is mounted on the spigot 14. A fill hole 76 is made in the spigot corrugation 45 near the bottom of the spigot 14, and a vent hole 78 is made in the spigot corrugation 45 at the top of the spigot 14. Both components of a two-component polyurethane resin are mixed together. The resulting liquid resin 79 is inserted through the fill hole 76 into the cavity 60. The resin 79 expands through foaming action to fill the entire cavity 60 and then solidifies to form the foam filler 74 (FIG. 5). The filler 74 thus has a solid state attained by curing of the filler 74 from a prior liquid state while confined within the cavity 60.

The polyurethane resin used in this embodiment is of a type that can expand to about twenty times its initially-mixed volume when unconfined and freely expanded. If the liquid resin 79 were free to expand and solidify while unconfined, the resulting foam would then achieve a "freely expanded density."

The volume of resin 79 inserted in the cavity 60 is about one tenth the volume of the cavity 60. Therefore, the resin 79 in the cavity 60 can expand to only about ten times its initially-mixed volume. Consequently, the resulting foam 74 (FIG. 5) has an actual density that is twice the freely expanded density. The density of the resulting foam 74 is thus greater than the freely expanded density, yet not so great as to render the foam 74 stiffer than the spigot corrugation 45.

Referring to FIG. 5, after the foam 74 has solidified within the cavity 60, the gasket seat 58 is routed to ensure that the surface of the gasket seat 58 is smooth and dimensionally correct. Then, the gasket 66 is mounted on the spigot 14 and is seated on the gasket seat 58.

Figure 7:
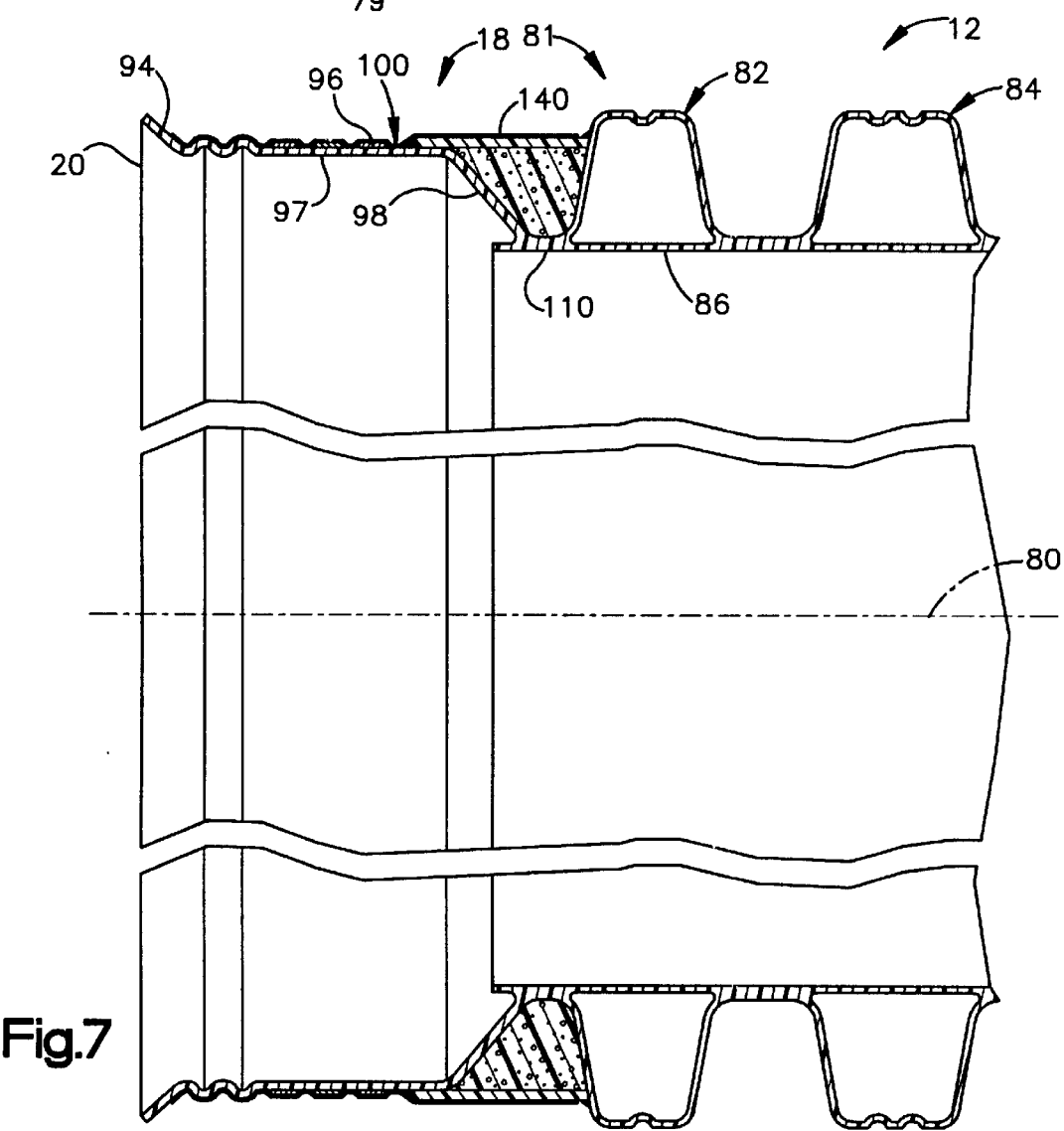
FIG. 7 is a sectional view of the second pipe of FIG. 1.
Figure 8:
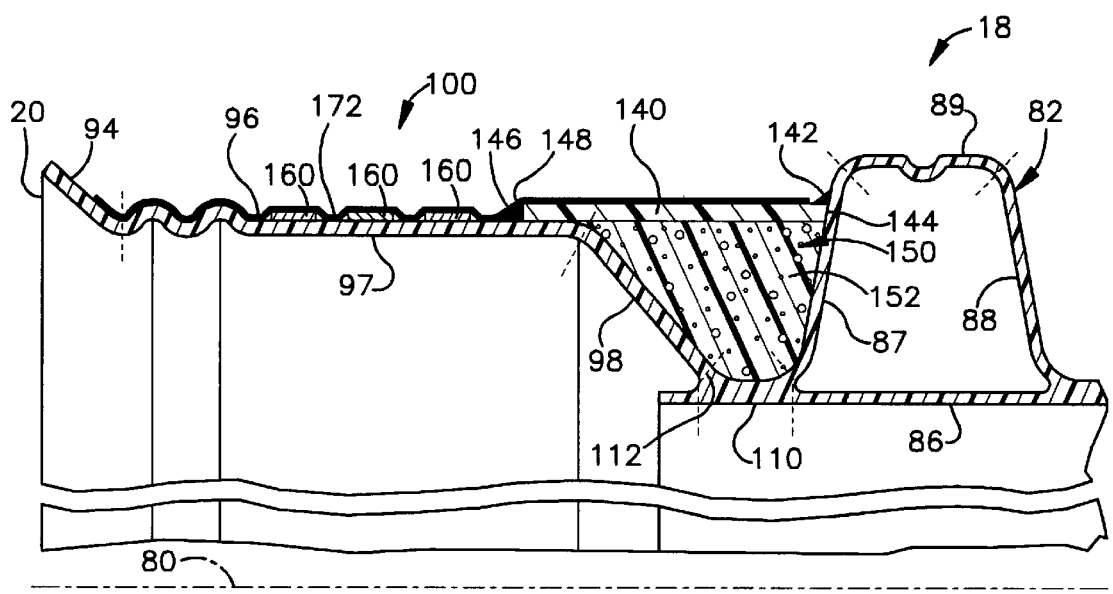
FIG. 8 is an enlarged partial view of parts shown in FIG. 7.

As shown partially in FIG. 7, the second pipe 12 is centered on an axis 80. The second pipe 12 has a corrugation portion 81 that comprises a series of corrugations extending from the bell structure 18 to an opposite end portion (not shown) of the second pipe 12. Only first and second corrugations 82 and 84 of the corrugation portion 81 are shown fully in FIG. 7. These corrugations 82 and 84 are similar in structure to the second corrugation 28 (FIG. 4) of the first pipe 10. As shown in FIG. 8, the first corrugation 82 has a liner 86, first and second sidewalls 87 and 88, and a crown 89.

The bell structure 18 of the second pipe 12 is centered on the central axis 80 of the second pipe 12. As in FIG. 4, dashed lines in FIG. 8 are used to indicate boundaries between adjacent sections. The bell structure 18 has a conical flare 94 extending axially and radially inward from the open outer end 20. A barrel 96 of the bell structure 18 extends axially inward form the flare 94. The barrel 96 has a radially inner surface 97. In this embodiment, the radially inner surface 97 is tapered slightly from an otherwise cylindrical configuration and thus has a somewhat conical configuration. An annular backwall 98 of the bell structure 18 extends axially and radially inward from the barrel 96. The flare 94, the barrel 96 and the backwall 98 together form a bell 100.

The bell structure 18 further comprises an annular root 110. The root 110 extends axially inward from the radially inner end 112 of the backwall 98 to the liner 86 of the first corrugation 82. The bell 100, the root 110 and the corrugations 82 and 84 (FIG. 7) are all preferably formed of polyethylene.

A cylindrical reinforcing ring 140 is centered on the axis 80, as shown in FIG. 8. The ring 140 extends axially from the bell 100 to the first corrugation 82. The ring 140 constrains axial movement of the bell 100 relative to the corrugation 82. In this embodiment, the ring 140 is formed of a looped plastic strip. The ring 140 is welded to the first sidewall 87 by an annular first bead 142 of plastic. The first bead 142 fuses and bonds an axially inner end 144 of the ring 140 to the first sidewall 87. Likewise, the ring 140 is welded to the barrel 96 by an annular second bead 146 of plastic. The second bead 146 fuses and bonds the axially outer end 148 of the ring 140 to the barrel 96.

The bell 100, the root 110, the first corrugation 82 and the ring 140 define an annular bell cavity 150 centered on the axis 80. The bell cavity 150 is filled with a filler 152. In this embodiment, the filler 152 is polyurethane foam. The filler 152 structurally reinforces the backwall 98. A different embodiment can omit the filler 152.

Figure 9:
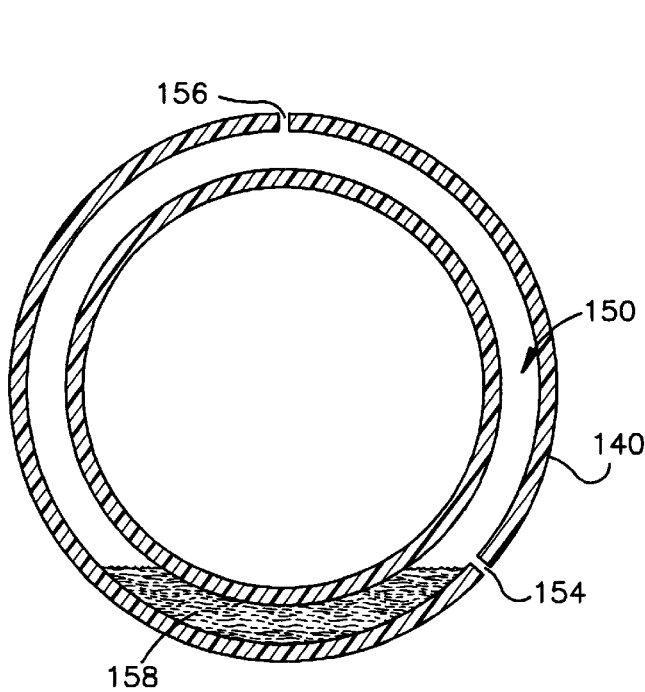
FIG. 9 is a sectional view of the second pipe of FIG. 1, shown in a partially assembled condition.

The process for filling the bell cavity 150 with the filler 152 is partially illustrated in FIG. 9. This process is similar to the process described with reference to FIG. 6 for filling the spigot cavity 60 (FIG. 5) with the filler 74 (FIG. 5). As shown in FIG. 9, a fill hole 154 is made near the bottom of the ring 140, and a vent hole 156 is made at the top of the ring 140. Both components of a two-component polyurethane resin are mixed together. The resulting liquid resin 158 is inserted through the fill hole 154 into the cavity 150. The liquid resin 158 expands through foaming action to fill the entire cavity 150 and then solidifies to form the foam filler 152 shown in FIG. 8. The resulting filler 152 thus has a solid state attained by curing of the filler 152 from a prior liquid state while confined within the cavity 150. The volume of the resin 158 (FIG. 9) inserted into the cavity 150 is chosen such that the actual density of the filler 152 in the expanded state will be greater than (preferably twice) the freely expanded density of the resin 158 (FIG. 9).

Figure 10:
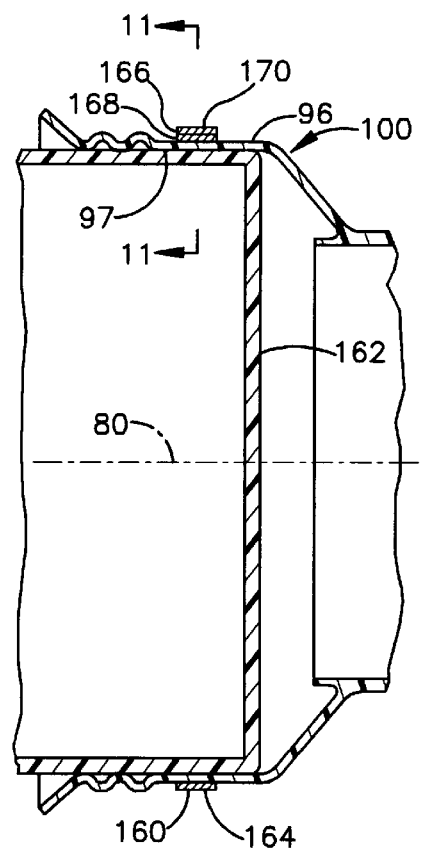
FIG. 10 is a sectional view of the second pipe of FIG. 1.
Figure 11:
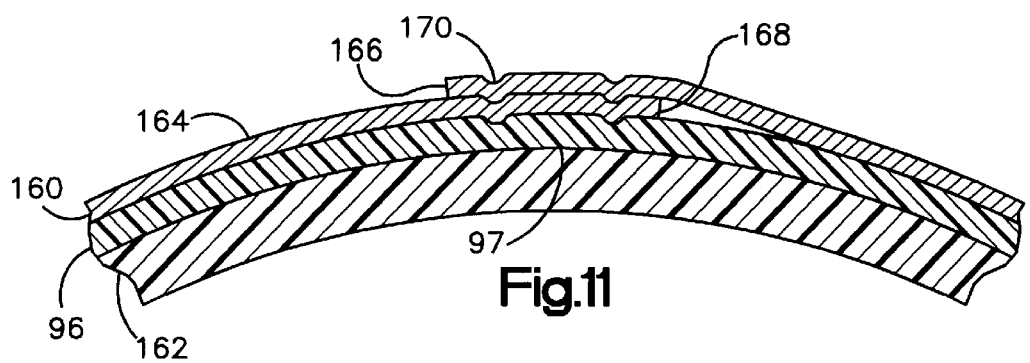
FIG. 11 is a sectional view taken on line 11—11 of FIG. 10.

As shown in FIG. 8, the bell structure 18 further comprises three steel reinforcing bands 160 wrapped around the barrel 96 and axially spaced from each other. The process for installing the bands 160 is illustrated in FIGS. 10 and 11. A cylindrical proving ring 162 is inserted in the barrel 96 of the bell 100. The proving ring 162 is dimensioned to fit within the barrel 96 and to impart a desired circumference to the barrel 96. To form each band 160, a steel strap 164 is wrapped under tension around the barrel 96. The tension forces the radially inner surface 97 of the barrel 96 to adopt an inner circumference that equals the outer circumference of the proving ring 162. Then, two opposite ends 166 and 168 of the strap 164 are fastened together with a clipless crimp 170. The band 160 is thus installed about the barrel 96. The proving ring 162 is then removed. During this process, the bands 160 serve to impart a desired circumference to the radially inner surface 97 of the barrel 96. During use of the bell structure 18, the bands 160 serve to resist circumferential expansion of the radially inner surface 97 of the barrel 96. As shown in FIG. 8, a length of plastic tape 172 is wrapped around the bands 160. The tape 172 circumferentially covers the bands 160 to protect the bands 160 from abrasion or corrosion, and/or can be used for product identification.

Another process for installing the bands 160 does not require use of the proving ring 162. In this process, the steel strap 164 is wrapped about the barrel 96. Two portions of the strap 164, located near the two ends 166 and 168, are fastened together to form the strap 164 into the reinforcing band 160 such that the band 160 has a predetermined inner circumference. The inner circumference is predetermined such that the band 160 forces the radially inner surface 97 of the barrel 96 to adopt and maintain a desired circumference.

Figure 12:
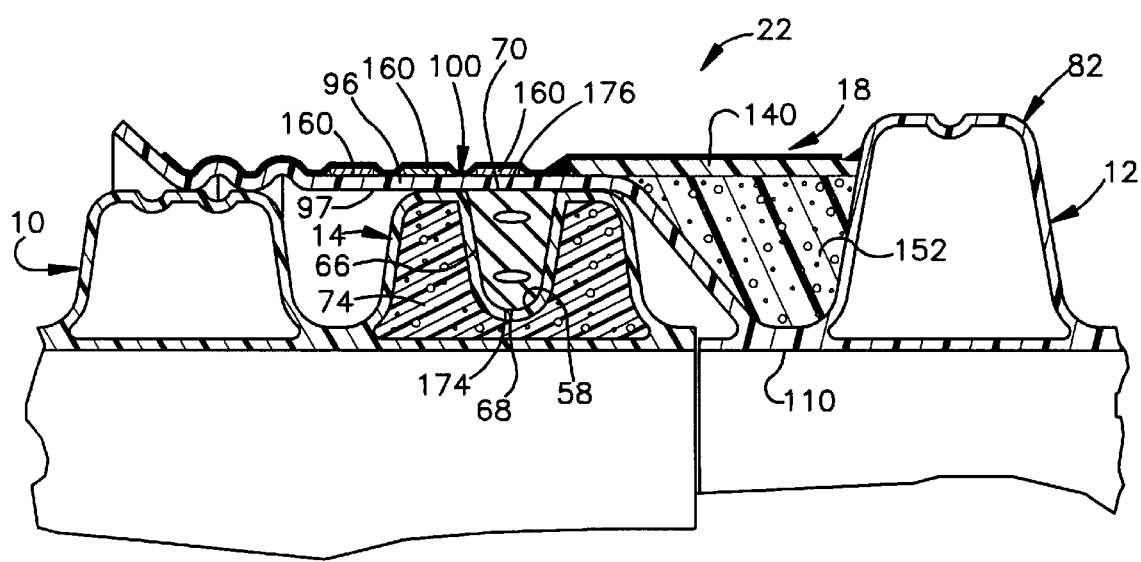
FIG. 12 is an enlarged sectional view of parts shown in FIG. 2.

As shown in FIGS. 12, the sealed joint 22 is formed by insertion of the spigot 14 of the first pipe 10 into the barrel 96 of the second pipe 12. The radially inner surface 68 of the gasket 66 forcefully engages the gasket seat 58 in the first pipe 10 to form a first annular watertight seal 174. Similarly, the radially outer surface 70 of the gasket 66 forcefully engages the radially inner surface 97 of the barrel 96 to form a second annular watertight seal 176.

Figure 13:
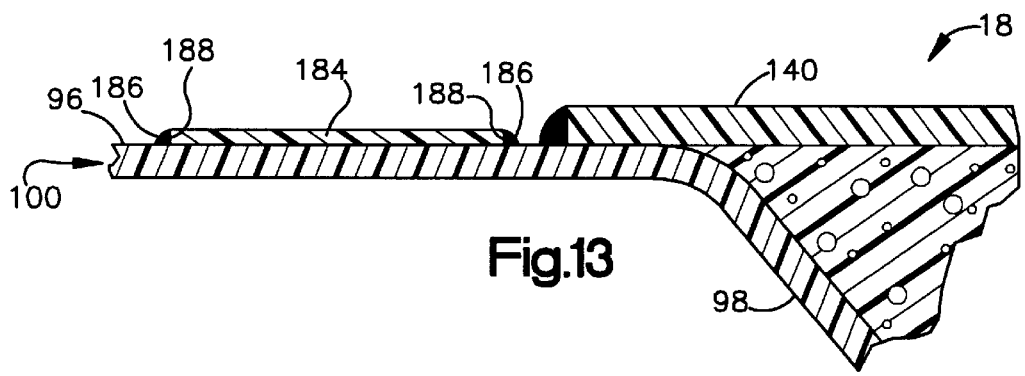
FIG. 13 is a sectional view of a another embodiment of the invention.

As described above with reference to FIGS. 8 and 11, the three steel bands 160 are crimped in place about the barrel 96 and covered by the tape 172. In another embodiment, as shown in FIG. 13, a single plastic band 184, such as of polyethylene, is wrapped about the barrel 96. The band 184 is welded in place with two beads 186 of melted plastic applied along two axially opposite edges 188 of the band 184. The beads 186 fuse and bond the band 184 to the barrel 96. Alternatively, the plastic band 184 can be of another plastic material, such as polyester, and can be friction welded to the barrel 96.

The invention has been described with reference to preferred embodiments. Those skilled in the art will perceive improvements, changes and modifications. Such improvements, changes and modifications are intended to be within the scope of the claims.

What is claimed is:

1. A pipe structure comprising:
a bell centered on an axis, said bell having an open outer end and a barrel configured to telescopically receive a section of another pipe structure inserted inward through said open outer end, said bell further having an annular backwall extending radially inward from said barrel;
a first corrugation axially adjacent to said bell; and
a reinforcing structure extending axially from said bell to said first corrugation to constrain axial movement of said bell relative to said first corrugation.

2. The pipe structure of claim 1 wherein said reinforcing structure is a ring-like structure that extends around said axis.

3. The pipe structure of claim 1 wherein said first corrugation has an annular liner, and said pipe structure further comprises an annular root that extends from a radially inner end of said backwall to said liner.

4. The pipe structure of claim 3 wherein said bell, said root, said first corrugation and said reinforcing structure together define an annular cavity that contains a filler.

5. The pipe structure of claim 4 wherein said filler has a solid state attained by curing of said filler while confined within said cavity.

6. The pipe structure of claim 4 wherein said filler is a foam.

7. The pipe structure of claim 6 wherein said foam has an expanded state that has an actual density that is greater than a freely expanded density of said foam.

8. The pipe structure of claim 1 further comprising an annular band wrapped about said barrel and configured to resist circumferential expansion of said barrel.

9. The pipe structure of claim 8 wherein said band comprises a strap having two opposite ends that are fastened together.

10. The pipe structure of claim 8 further comprising an annular tape circumferentially covering said band and configured to protect said band.

11. A method of reinforcing a bell of a pipe, said bell having a barrel configured to telescopically receive a section of another pipe, said method comprising:
inserting a proving ring within said barrel, said proving ring having a predetermined outer circumference;
wrapping a strap about said barrel with a tension that forces a radially inner surface of said barrel to adopt an inner circumference that equals the outer circumference of said proving ring;
installing said strap about said barrel to resist circumferential expansion of said radially inner surface of said barrel; and
removing said proving ring.

12. The method of claim 11 wherein said installing is achieved by fastening together two opposite ends of said strap with a clipless crimp.

13. A method of reinforcing a bell of a pipe, said bell having a barrel configured to telescopically receive a section of another pipe, said method comprising:
wrapping a strap about said barrel;
fastening two portions of said strap together to form said strap into a band having a predetermined inner circumference;
said inner circumference chosen such that said band forces a radially inner surface of said barrel to adopt and maintain a desired inner circumference.

14. A pipe structure comprising:

an annular corrugation centered on an axis, said corrugation comprising a cylindrical liner centered on the axis, two annular sidewalls extending radially outward from axially opposite ends of said liner, and an annular crown extending axially between radially outer ends of said sidewalls;

an annular cavity centered on said axis and bounded by said liner, said sidewalls and said crown; and a structural filler contained within said cavity, said filler having a solid state attained by curing of said filler while confined within said cavity.

15. A pipe structure comprising:

an annular corrugation centered on an axis, said corrugation comprising a cylindrical liner centered on the axis, two annular sidewalls extending radially outward from axially opposite ends of said liner, and an annular crown extending axially between radially outer ends of said sidewalls;

an annular cavity centered on said axis and bounded by said liner, said sidewalls and said crown; and a structural filler contained within said cavity, said filler being a foam.

16. The pipe structure of claim 15 wherein said foam has an expanded state that has an actual density that is greater than a freely expanded density of said foam.

17. A pipe structure comprising:

an annular corrugation centered on an axis, said corrugation comprising a cylindrical liner centered on the axis, two annular sidewalls extending radially outward from axially opposite ends of said liner, and an annular crown extending axially between radially outer ends of said sidewalls;

an annular cavity centered on said axis and bounded by said liner, said sidewalls and said crown; and a filler contained within said cavity in a solid state.

18. The pipe structure of claim 17 wherein said crown defines an annular groove extending radially inward and centered on said axis, and wherein said pipe structure further comprises an annular gasket received within said groove and configured to provide a seal between said pipe structure and a section of another pipe structure that telescopically receives said pipe structure.

19. The pipe structure of claim 18 wherein said crown defines a gasket seat which is at the bottom of said groove and which is rounded.

20. The pipe structure of claim 17 wherein said solid filler is a foam.

* * * * *